(12) United States Patent
Zeuschner et al.

(10) Patent No.: US 8,181,430 B2
(45) Date of Patent: May 22, 2012

(54) METHOD FOR STACKING PACKAGED FOOD SLICES

(75) Inventors: Roland Zeuschner, Argenbuhl (DE); Ottmar Rupp, Argenbuhl (DE); Andreas Biggel, Hergatz (DE)

(73) Assignee: Hockland Natec GmbH, Heimenkirch (DE)

( * ) Notice: Subject to any disclaimer, the term of this patent is extended or adjusted under 35 U.S.C. 154(b) by 382 days.

(21) Appl. No.: 12/423,067

(22) Filed: Apr. 14, 2009

(65) Prior Publication Data

US 2009/0308027 A1    Dec. 17, 2009

(30) Foreign Application Priority Data

Apr. 15, 2008    (DE) .......................... 10 2008 019 028

(51) Int. Cl.
*B65B 35/50* (2006.01)
(52) U.S. Cl. ................ 53/447; 53/445; 53/540
(58) Field of Classification Search ............ 53/447, 53/445, 399, 446, 449, 540, 154
See application file for complete search history.

(56) References Cited

U.S. PATENT DOCUMENTS

| | | | | |
|---|---|---|---|---|
| 4,019,624 A | * | 4/1977 | Torres | 198/459.8 |
| 4,676,050 A | * | 6/1987 | Odenthal | 53/447 |
| 4,682,684 A | * | 7/1987 | Lothman | 198/459.8 |
| 4,947,624 A | * | 8/1990 | Cones et al. | 53/540 |
| 5,412,923 A | * | 5/1995 | Lashyro et al. | 53/399 |
| 5,430,992 A | * | 7/1995 | Olson | 53/399 |
| 5,450,708 A | * | 9/1995 | Lashyro | 53/399 |
| 5,758,474 A | * | 6/1998 | Ziegler | 53/447 |
| 5,768,857 A | * | 6/1998 | Ward et al. | 53/447 |
| 6,058,679 A | * | 5/2000 | Ziegler et al. | 53/448 |
| 6,134,865 A | * | 10/2000 | Long | 53/540 |

* cited by examiner

*Primary Examiner* — Sameh H. Tawfik
(74) *Attorney, Agent, or Firm* — Millen, White, Zelano & Branigan, P.C.

(57) ABSTRACT

The invention relates to a method and device for producing packs of a food that comes in slices, in particular individually packaged processed cheese slices. The pack of food is put together from two uniform product stacks of food slices. The first product stack is transported via a first feed segment, and the second product stack is transported via a second feed segment, in each case horizontally by means of a transport means at transport speed. The feed segments are guided over one another in parallel in a collection area, and the upper feed segment ends at a sliding edge that defines a collection point, whereby means for synchronization are adjusted such that a product stack that arrives via the sliding edge is neatly placed onto the product stack that is transported to the lower feed segment.

10 Claims, 2 Drawing Sheets

METHOD FOR STACKING PACKAGED FOOD SLICES

The invention relates to a method for producing packs of a food that comes in slices, in particular packs or packets of individually packaged processed cheese slices. In addition, the invention relates to a device for implementing the method and the packs themselves.

Specifically from the area of processed cheese processing, a number of options for packaging single slices are known. To make the product attractive, in most packages, the slices are readily visible to the consumer from the outside. In general, two types of packaging can be distinguished:

On the one hand, it is known to stack single cheese slices directly on top of one another and to package such stacks of self-adhering cheese slices in portions in dish-shaped containers. To make it easier to remove such slices that are packaged together, the latter are stacked in a somewhat staggered fashion. During the production and processing, the stacks are transported in most cases lying on conveyor belts.

On the other hand, of course, slices are also enclosed individually by film, whereby stacks of such individually packaged slices are enclosed in addition by an additional, in particular film-like, outer packaging. In contrast to the above-mentioned slices that are packaged together, the individually packaged slices are in most cases further processed standing vertically on their edges and guided by brushing belts, whereby in particular they are covered with outer packaging. The problem of this processing in the recumbent position lies in the fact that stacks of individually packaged slices easily slip if they are lying flat on top of one another. This makes the horizontal processing occasionally difficult.

It is common to both methods, however, that the thus produced and packaged stacks in each case consist only of slices of a type of the respective food, in particular processed cheese.

The object of this invention is now to propose a method that is to be implemented with technically simple means and a corresponding device with which it is possible to produce packs of slices of different types, in particular cheese slices of varying formulations, in large amounts and at high speed.

These objects are achieved by a the method with the characterizing features of a total pack being put together from two uniform product stacks of slices, whereby the first product stack is transported via a first feed segment and the second product stack is transported via a second feed segment, in each case horizontally by means of a transport means at transport speed, whereby the feed segments are run over one another in parallel in a collection area and the upper feed segment ends at a sliding edge that defines a collection point, whereby means for synchronization are adjusted such that a product stack that arrives via the sliding edge is neatly placed onto the product stack that is transported to the lower feed segment. These objects are also achieved by a device with the characterizing features of a first feed segment for the horizontal transport of a first product stack and a second feed segment for horizontal transport of a second product stack, whereby each feed segment is assigned a transport means that moves the respective product stack at a feed speed, whereby the two feed segments are arranged on top of one another in a collection area, whereby the upper feed segment ends in a collection area at a sliding edge, whereby means for synchronization are provided that achieve the neat layering of a product stack that arrives via the sliding edge on the product stack that is transported to the lower feed segment.

First, the invention is based on the essential idea that the common total pack (also named "packet" below) is combined from at least two uniform single stacks of single slices (also "product stacks"), whereby the single stacks in each case comprise several, in particular about five, single slices. Each of the single stacks is fed in each case via a separate feed segment to a collection point, where the single stacks are then stacked on top of one another in a synchronized manner to form the total packs and then the packet. It can be quite especially advantageous to implement the method when the two product stacks contain individually packaged processed cheese slices of varying formulations.

To this end, the first single stack is transported at transport speed via a first feed segment and the second single stack is transported at transport speed via a second feed segment by using in each case a transport means, which can be a conveyor belt. The feed segments that first optionally run beside one another are then guided over one another and ultimately run over one another in parallel in a collection area, before the upper feed segment ends at a sliding edge that defines a collection point. Before the upper single stack can slide over the sliding edge onto the single stack that lies thereunder, its movement is synchronized by appropriate means with the single stack moving below so that the two single stacks are stacked neatly to form the packet.

The essential function of the procedure according to the invention thus lies in the position-appropriate stacking of two incoming single stacks above one another to form the packet. Bringing two single stacks together in this way can be repeated with devices arranged in a cascading fashion one behind the other. In this case, in the case of processed cheese, the single stacks can be on the order of between 4 and 10 single slices. A special advantage of the procedure lies in the fact that with great throughput, an end product that is attractive to the consumer is produced with two or more single stacks of varying types or varying formulations. In this case, different numbers of slices per single stack are also possible. The thus put-together packs of two combined single stacks can subsequently be fed to a packaging machine, with which the packs obtain an additional consumer-friendly outer packaging. To ensure an especially sterile package in this case, it is especially advantageous in the specific case of processed cheese slices if the outer packaging is formed by a hermetically sealed film sleeve. With the procedure according to the invention, up to 150 total packs per minute can easily be produced.

The synchronization can be especially simply supported structurally when driver means are provided that push on the single stacks to be combined from the rear relative to the transport direction and move the latter forward at a driver speed via the collection point and thus push the two product stacks out of the feed segments to a certain extent. To achieve this, it is advantageous if the upper single stacks are guided by brushing belts applied laterally over a guide sheet that is designed as a sliding sheet, through a driver means extended from below.

This pushing out or "combing out" is then possible when the speed of the driver means is higher than one of the two transport speeds, in particular higher than that of the upper brushing belt, whereby the transport speeds can be different. A driver means is especially simple to produce when it is equipped with driver arms that engage somewhat vertically to the transport direction via the two feed segments that lie on top of one another and push on the two product stacks in each case from the rear. In this way, the neat layering of the single stack can be easily achieved, whereby the driver arms resting against them can prevent the single stacks from moving relative to one another.

In one embodiment that is especially to be preferred, the sliding edge is made from a thin sliding sheet that is inclined downward. This has the advantage that the sliding sheet can be made with a small thickness and thus can be brought in especially closely to the sliding edge on the surface of the single stack that is transported on the lower feed segment. In this way, the distance that is available for the free fall of the upper single stack is reduced, so that the upper stack can be placed especially smoothly onto the one below it. It may be advantageous, moreover, to provide the sliding sheet, similar to a ski jump, with a "jump-off platform" to achieve as parallel a guiding of the two single stacks as possible. To be able to bring the sliding edge, even when the single stacks to be processed are at different heights, into a position just above the surface of the lower single stack, it is advantageous for the sliding sheet to be attached in a pivoting manner.

In an especially advantageous embodiment, the sliding sheet can be pivoted upward in such a way that the feed of the single stack can be completely decoupled via the upper feed segment. In this mode of operation, no packs are produced, but rather only single stacks are fed to the means for outer packaging. Such a mode of operation ("mono-operation"), for which the web-strap belt that is provided for synchronization optionally also has to be exchanged for a normal conveyor belt, can be used for interim changes in production. With the pivoting, a possible product jam can also be eliminated. Moreover, this option contributes to avoiding mishaps.

The brushing belts arranged on the sides of the sliding sheet and laterally holding the single stacks contribute to the controlled downward motion on the sliding sheet. Such brushing belts are known in the art from the processing of such product slices. On the surface, they have a number of projecting bristles with which a product stack can be grasped in a clamping fashion. The brushing belts are driven such that they run the clamped single stacks downward and then deposit them on the surface of the lower product stack. The brushing belt transports the product stack advantageously obliquely downward onto a "web-strap belt" that is used as a driver means and equipped with driver arms, and said "web-strap belt" penetrates the sliding sheet from below and "combs out" the upper single stack from the guide by the brushing belts.

In the procedure according to the invention, the single stacks are fed to the collection area via two different conveyor belts at a specific timing rate. If any of the conveyor belts carries 125 single stacks per minute, for example, at 30 m/min, there is in each case a distance of about 6 cm between two single stacks if the latter have a length of 10 cm. Thus, two single stacks can be staggered by about 8 cm or by 0.15 second based on the "clock cycle." To be able to compare such differences effectively, it is advantageous to provide shorter synchronization belts that can correspondingly delay or accelerate the oncoming single stacks. In this case, the control of the synchronization belts can be carried out by means of light barriers, with which the positions of the bypassed single stacks are identified. The length of the synchronization belts, which can be provided in both conveyor belts, is determined from the above-mentioned parameters. It is about double the length of the single stacks that are to be processed.

Since this synchronization depends basically on the transport speed of the conveyor belts, it is advantageous to make the latter individually flexibly adjustable. Thus, at the intake of the two conveyor belts, the single stacks can be counted, which makes possible the determination of a basic speed for the speed-regulated conveyor belts. Depending on the location of the single stacks, a superimposed movement is executed on the belts.

On the two conveyor belts, the single stacks normally come in the same numbers so that the single stacks can be presynchronized on the first and second regulated belts to ensure exact positioning. After the third regulated belt, it is fed in sequence into the web-strap belt. The speed is advantageously altered so that the stacks always go into the web-strap belt.

After the product stacks are merged into the total packs, the latter are taken off via a removal segment. In this case, it is advantageous to provide in the removal segment a pressing means, which gently presses down on the total packs from above and thus causes adhesion to some extent. In the case of the individually packaged processed cheese slices, this improved adhesion, which simplifies further processing, in particular the attachment of the outer packaging, is due in particular to the slight amount of moisture stilling remaining between the slices. In the simplest case, the pressing means can have a driven pressing role, which presses the total packs together from above with the weight of the roller and a swivel lever.

In addition, it is advantageous to provide in the outlet a monitoring of the height and the length of the total packs and to remove any excess found from the method via a subsequent station. Total packs that separate out can optionally be manually piled up and recycled in the process. In addition, a length monitor and/or a height monitor with a connected separation device, for example in the form of a pneumatic switch, can be located in the outlet. If the length or the height of the total packs is out of order, the separating-out device also ejects individual total packs. In general, separated-out total packs can be pushed via a switch to the outside position of the belt onto a buffer table, a broad strip about 2½ times the product width, and stacked, if necessary, by plant personnel and fed back into the cycle.

BRIEF DESCRIPTION OF THE DRAWINGS:

Below, the invention is explained in more detail based on FIGS. 1 to 3. Here.

In FIG. 1, first a device for producing packs 7 is shown in top view. This has a first upper feed segment 1 for the horizontal transport of a first product stack 2 and a second lower feed segment 3 for the horizontal transport of the second product stack 4. Optionally present sealing seams of the product stacks 2 and 4 are located to the right and left, viewed in transport direction. The feed segments 1 and 3 have conveyor belts as transport means, which in each case move the respective product stacks 2 and 4 at a feed speed in the direction of the arrow. The conveyor belts are controlled by drive rollers 5 that can be actuated separately. In the collection area, the conveyor belts are arranged on top of one another, whereby the upper feed segment ends at a sliding edge 6 (see also FIG. 3).

Figure 1:
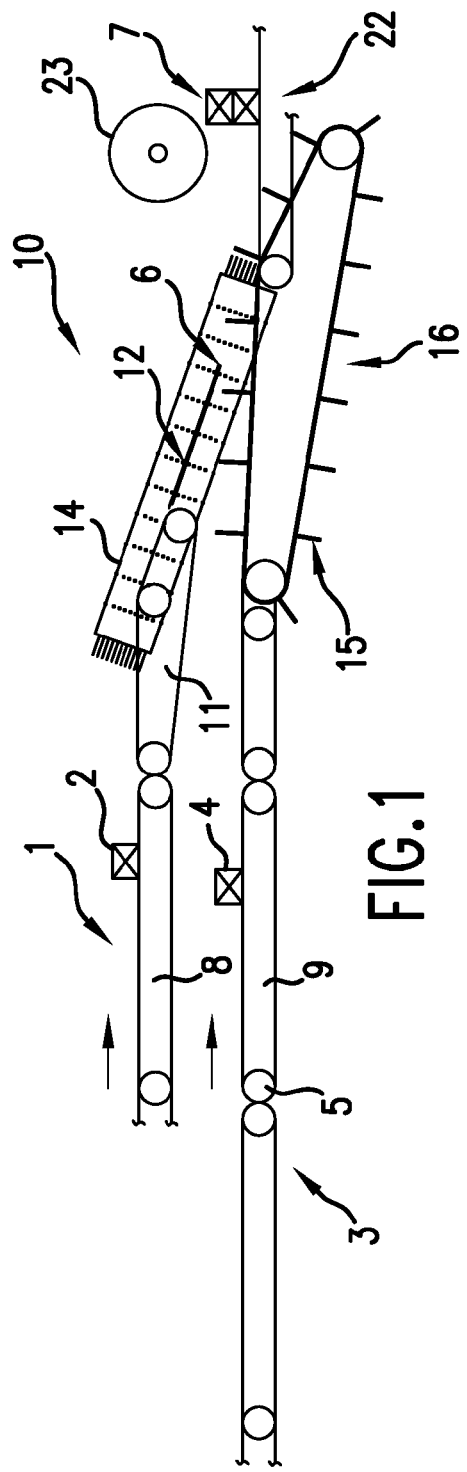
FIG. 1 shows a device for producing packs in top view.

To ensure that the product stack 2 that arrives via the sliding edge 6 is neatly placed onto the product stack 4, means are provided for synchronization. The latter comprise, on the one hand, light barriers, not shown, that detect whether and when product stacks in the feed segments 1 and 3 are bypassed. With the information from the light barriers, the conveyor belts 8 and 9 that are designed as synchronization belts are accelerated or slowed so that the product stacks 2 reach the collection area 10 in a roughly synchronized fashion. In this case, three such synchronization belts a), b) and c) are present in each case above and below.

Figure 3:
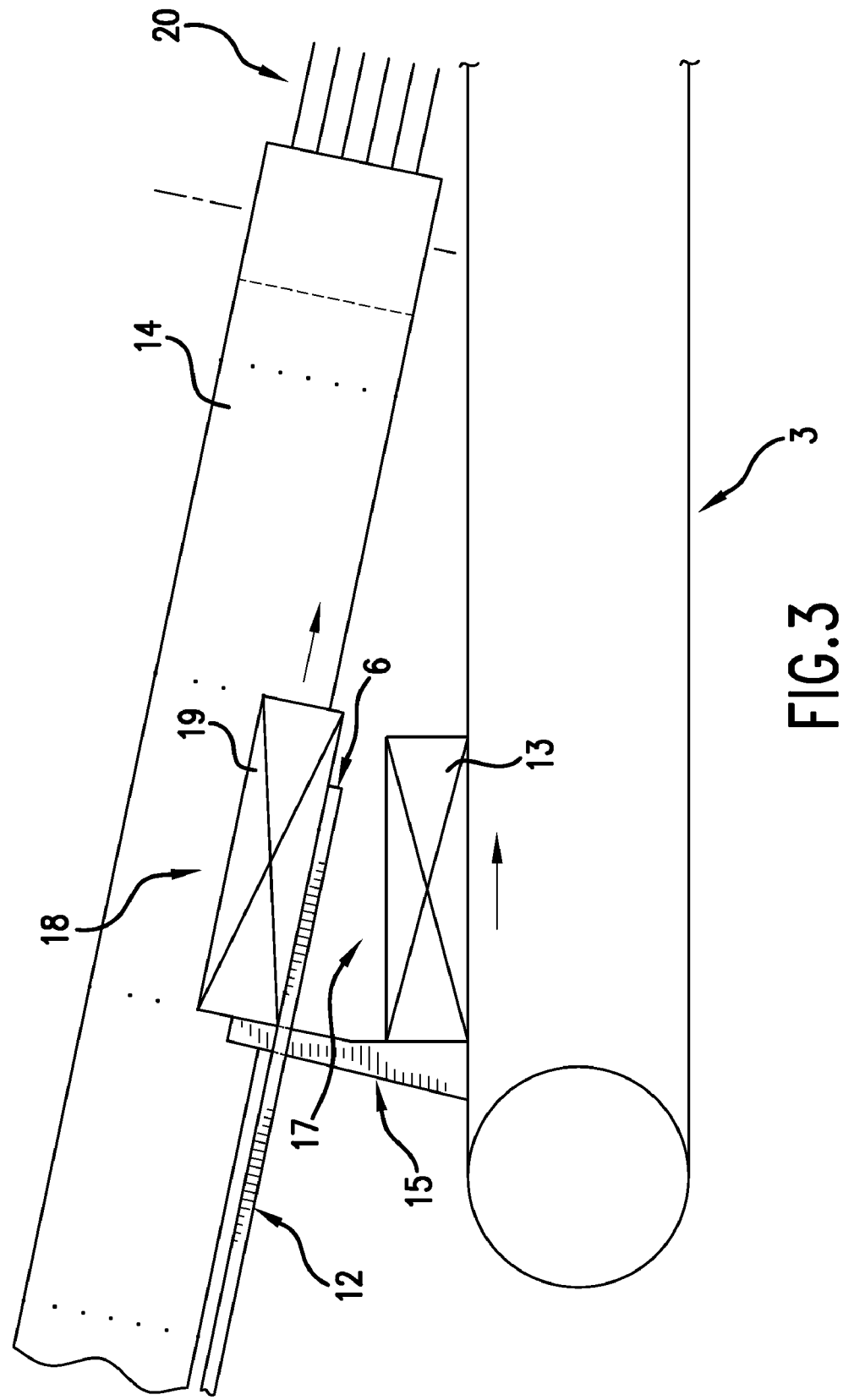
FIG. 3 shows the collection area of the device.

In the collection area 10, a conveyor belt 11 is converted into a sliding sheet 12 that is inclined downward and that forms the sliding edge 6. The inclination of the sliding sheet 12 is adjusted so that the sliding edge 6 reaches slightly above the surface of the product stacks 13 transported to the lower feed segment (FIG. 3). Downward-transporting brushing belts 14 are located on both sides of the sliding sheet 12, and said belts clamp incoming product stacks between the brushing tufts 20 and guide them downward over the sliding edge 6.

Figure 2:
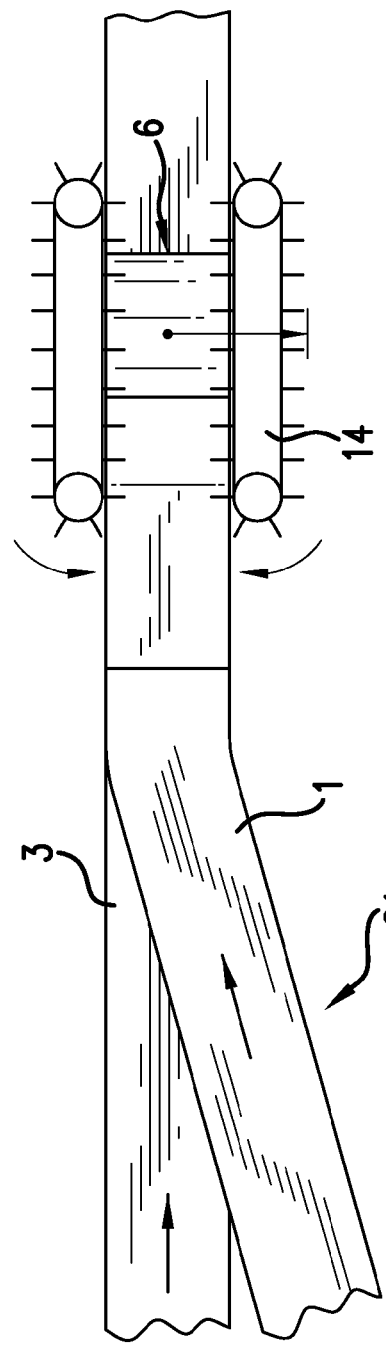
FIG. 2 shows a device for producing packs in a view.

In FIG. 2, the feed segments 1 and 3 are shown in top view. The upper feed segments 1 are raised before the collection area 10 and are guided into an S-curve 21 via the lower feed segment 3. Before the sliding edge 6, both feed segments then run exactly parallel.

The means for synchronization have, moreover, a driver device that is designed as a continuous web-strap belt 16 that is equipped with driver arms 15. As can be seen in FIG. 3, the driver arms 15 penetrate the two feed segments 17 and 18 that lie on top of one another. It is also clear that the driver arm 15 pushes from the rear against two product stacks, the lower product stack 13 that rests on the conveyor belt 3 and the upper product stack 19 that is clamped between the brushing belts 14, and pushes them—at a driver speed that is higher than or at least equal to the maximum transport speed—over the sliding edge, and thus places them on top of one another. So that the packages rest against the "pushing" driver arms, they are pressed against the web straps by baffles that are arranged on both sides of them. The brushing belt 14 transports the single stack 19 obliquely downward to the web-strap belt. The driver arms then entrain the completed package. To ensure reliable pushing of the driver arm 15 on the single stack 19, the brushing belt 14 runs somewhat slower than the lower conveyor belt 3.

After the collection, an outflow segment 22 for discharging the total packs 7 is provided, whereby in the outflow segment 22, a driven pressing roller 23 presses the total packs 7 together from above in particular with the weight of a roller and a swivel lever. In the outflow, a monitoring of the total packs 7 also takes place, whereby the height is examined with a laser sensor and the length with light scanners. The roller can be stopped in mono-operation even in an upper position.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding DE application No. 10 2008 019 028.4, filed Apr. 15, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for producing total packs (7) of a food that comes in slices, said process comprising:
    putting together a total pack (7) from two uniform product stacks (2, 4) of slices, whereby the first product stack (2) is transported via a first feed segment (1) and the second product stack (4) is transported via a second feed segment (3), in each case horizontally by means of a transport means at transport speed,
    whereby the feed segments (1, 3) are run over one another in parallel in a collection area (10) and the upper first feed segment (1) ends at a sliding edge (6) that defines a collection point (10),
    whereby means for synchronization are adjusted such that a product stack (2) that arrives via the sliding edge (6) is neatly placed onto a product stack (4) that is transported via the lower second feed segment,
    wherein a sliding sheet (12) that is inclined downward forms the sliding edge (6), whereby the inclination is adjusted such that the sliding edge (6) is arranged just above the surface of the product stack (4) that is transported to the lower feed segment (3), and wherein said sliding sheet (12) can be pivoted, and
    wherein downward-transporting brushing belts (14) are located on the sides of the sliding sheet (12), and the surfaces of said brushing belts are provided with a number of projecting brushing tufts (20), whereby the brushing belts (14) clamp a product stack between the brushing tufts and guide them downward.

2. The method according to claim 1, wherein the two product stacks (2, 4) contain individually packaged processed cheese slices of varying formulations.

3. The method according to claim 2, wherein the means for synchronization has a driver means (15) that pushes relative to the transport direction from the rear on the two product stacks (2, 4) that are to be put together and moves forward at a driver speed over the collection point (10), whereby the driver speed is higher than the transport speed specified by a brushing belt (14).

4. The method according to claim 2, wherein the total packs (7) of the two put-together product stacks (2, 4) are packaged by means of an outer packaging.

5. The method according to claim 1, wherein the means for synchronization has a driver means (15) that pushes relative to the transport direction from the rear on the two product stacks (2, 4) that are to be put together and moves forward at a driver speed over the collection point (10), whereby the driver speed is higher than the transport speed specified by a brushing belt (14).

6. The method according to claim 5, wherein the total packs (7) of the two put-together product stacks (2, 4) are packaged by means of an outer packaging.

7. The method according to claim 1, wherein the total packs (7) of the two put-together product stacks (2, 4) are packaged by means of an outer packaging.

8. The method according to claim 7, wherein the total packs (7) of the two put-together product stacks (2, 4) are packaged by means of a hermetically sealed film sleeve.

9. The method according to claim 8, wherein the total packs (7) of the two put-together product stacks (2, 4) are packaged by means of an outer packaging.

10. The method according to claim 1, wherein said means for synchronization has a driver device that comprises a driver arm (15) which penetrates the two feed segments that are on top of one another and that is moved at a driver speed.

* * * * *

UNITED STATES PATENT AND TRADEMARK OFFICE
CERTIFICATE OF CORRECTION

PATENT NO. : 8,181,430 B2  Page 1 of 1
APPLICATION NO. : 12/423067
DATED : May 22, 2012
INVENTOR(S) : Zeuschner et al.

It is certified that error appears in the above-identified patent and that said Letters Patent is hereby corrected as shown below:

Title Page, (73) Assignee: reads "Hockland Natec GmbH, Heimenkirch" should read --Hochland Natec GmbH, Heimenkirch--.

Signed and Sealed this
Sixteenth Day of October, 2012

David J. Kappos
*Director of the United States Patent and Trademark Office*